(12) United States Patent
Gulick

(10) Patent No.: US 6,760,852 B1
(45) Date of Patent: Jul. 6, 2004

(54) SYSTEM AND METHOD FOR MONITORING AND CONTROLLING A POWER-MANAGEABLE RESOURCE BASED UPON ACTIVITIES OF A PLURALITY OF DEVICES

(75) Inventor: Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 485 days.

(21) Appl. No.: 09/652,647

(22) Filed: Aug. 31, 2000

(51) Int. Cl.[7] .............................. G06F 1/32; G06F 13/00
(52) U.S. Cl. ........................ 713/324; 713/323; 710/306
(58) Field of Search ............................... 713/300, 322, 713/324, 340; 710/306

(56) References Cited

U.S. PATENT DOCUMENTS

| | | | | |
|---|---|---|---|---|
| 5,012,406 A | * | 4/1991 | Martin ........................ | 714/22 |
| 5,535,400 A | * | 7/1996 | Belmont ..................... | 713/300 |
| 5,666,497 A | * | 9/1997 | Milhaupt et al. .......... | 710/305 |
| 5,675,813 A | | 10/1997 | Holmdahl | |
| 5,692,202 A | | 11/1997 | Kardach et al. | |
| 5,778,194 A | * | 7/1998 | McCombs ................. | 713/600 |
| 5,884,088 A | * | 3/1999 | Kardach et al. ........... | 713/324 |
| 5,925,134 A | * | 7/1999 | Solomon .................... | 713/324 |
| 6,040,845 A | * | 3/2000 | Melo et al. ................. | 345/520 |
| 6,119,194 A | * | 9/2000 | Miranda et al. ............ | 710/306 |
| 6,151,681 A | | 11/2000 | Roden et al. | |
| 6,163,845 A | | 12/2000 | Zhao et al. | |
| 6,241,400 B1 | * | 6/2001 | Melo et al. ................. | 710/313 |
| 6,243,817 B1 | * | 6/2001 | Melo et al. ................. | 713/300 |
| 6,285,406 B1 | | 9/2001 | Brusky | |
| 6,295,566 B1 | * | 9/2001 | Stufflebeam ............... | 710/302 |
| 6,393,570 B1 | * | 5/2002 | Henderson et al. ........ | 713/310 |
| 6,460,143 B1 | * | 10/2002 | Howard et al. ............ | 713/323 |

FOREIGN PATENT DOCUMENTS

| | | | |
|---|---|---|---|
| EP | 019843147 C1 | * | 4/2000 |

OTHER PUBLICATIONS

"Small Computer System Interface Bus Concurrent Maintenance Device" IBM TDB, Aug. 1993, vol. 36, pp 261–262.*

International Search Report Application No. PCT/US 01/15122, mailed Aug. 29, 2002.

* cited by examiner

Primary Examiner—Jeffrey Gaffin
Assistant Examiner—Chun Cao
(74) Attorney, Agent, or Firm—Meyertons Hood Kivlin Kowert & Goetzel, P.C.; B. Noël Kivlin; Erik A. Heter

(57) ABSTRACT

A system and method for monitoring and controlling a power-manageable resource. In one embodiment, a power manageable resource, such as a bus in a computer system, may be shareable among a number of power-manageable devices. A resource monitor may also be coupled to the power-manageable resource. The resource monitor may be configured to monitor the devices coupled to the power manageable resource. More specifically, the functions of the resource monitor may include monitoring the active/inactive state of each of the attached devices. The resource monitor may be configured to cause the sharable resource to be powered down if it is determined that all the attached devices are in an inactive state.

24 Claims, 5 Drawing Sheets

SYSTEM AND METHOD FOR MONITORING AND CONTROLLING A POWER-MANAGEABLE RESOURCE BASED UPON ACTIVITIES OF A PLURALITY OF DEVICES

BACKGROUND OF THE INVENTION

1. Field of the Invention

This invention relates generally to the field of computer systems and, more particularly, to power management in computer systems.

2. Description of the Related Art

As more functions have been added to computer systems in recent years, power consumption has become an important design issue. Many computer systems now have built-in functionality to put them into a "sleep" mode after a certain amount of time elapses with no activity. However, many computer systems have a need for more advanced power management systems. This is especially true of portable computer systems and/or those that may operate on battery power.

When a typical computer system is put into a sleep mode, it is usually powered down in its entirety, saving the state of its processor and states of various other devices in a storage mechanism (such as a hard disk drive). Other more advanced power management techniques have been developed in order to allow a computer system to shut down specific parts of a system. One example would be a computer system which is designed to shut down a peripheral component interface (PCI) bus when the device or devices coupled to the bus are inactive. Such power management schemes may be very simple when a power-manageable resource such as a PCI bus has only one device coupled to it. However, when two or more independent devices share a power-manageable resource, power management schemes may be difficult to implement.

Power management in a shared resource such as a bus may be complicated by various factors. One such factor is the device drivers for the various devices that are coupled to the resource. Typically, a shared resource is independent of the various device drivers for those devices coupled to the resource. Prior to initiating suspension of power, the device driver for each device must read and store the state of that device and other housekeeping operations necessary for suspension of power. Once each device attached to the resource has completed the necessary suspend operations, the bus may be safely powered down. However, since the device drivers for each device operate independently of the bus, there is no communication mechanism to inform the bus hardware that all devices have completed the necessary suspend operations. Thus, with no communication mechanism, the bus hardware cannot determine whether it can safely powered down.

SUMMARY OF THE INVENTION

The problems outlined above are in large part solved by the use of the system and method for monitoring and controlling a power-manageable resource. In one embodiment, a power manageable resource, such as a bus in a computer system, may be shareable among a number of power-manageable devices. A resource monitor may also be coupled to the power-manageable resource. The resource monitor may be configured to monitor the devices coupled to the power manageable resource. More specifically, the functions of the resource monitor may include monitoring the active/inactive state of each of the attached devices. The resource monitor may be configured to cause the sharable resource to be powered down if it is determined that all the attached devices are in an inactive state.

In one embodiment, the power-manageable resource is a timeslot bus, configured to transmit data in frames. Each frame may include a plurality of status bits, and each of these status bits may correspond to one of the devices attached to the bus. Each status bit may be used to indicate the active/inactive status of the corresponding device. A resource monitor may be configured to monitor the status bits, and may cause the bus (and all attached devices) to be powered down responsive to determining that all devices are inactive.

In another embodiment, the bus may be a packet bus, and may be configured to periodically transmit idle frames, with each frame including a plurality of status bits. These status bits may correspond to devices attached to the bus, and may indicate the active/inactive status of each of the devices. A resource monitor may be configured to monitor the active/inactive status bits of each device. Alternatively, each of the devices coupled to the packet bus may be configured to transmit an activate packet responsive to becoming active, and a deactivate packet responsive to becoming inactive. The resource monitor may be used to track the active/inactive state of each of the devices attached to the bus. In one embodiment, the resource monitor may include a counter that is incremented each time a device sends an activate packet, and decremented when a device transmits a deactivate packet. The resource monitor may then power down the bus if the counter value reaches zero, indicating that all devices on the bus are inactive.

In still another embodiment, a plurality of registers may be used for indicating the active/inactive status of devices attached to a power-manageable resource, such as a bus. Each register may correspond to one of the attached devices. Each register may be updated responsive to its corresponding device becoming active or inactive. The registers corresponding to each device may be centrally located in a resource monitor in some embodiments. Alternatively, the registers corresponding to each device may be located within the device itself in other embodiments. In either case, the resource monitor may track the active/inactive state of each device by reading the registers, and may power down the bus when all devices have been determined to be inactive.

Thus, in various embodiments, the system and method for monitoring and controlling a power-manageable resource may allow a bus or other resource to be powered down when not in use. By monitoring each device attached to the resource, a resource monitor may be able to determine when it is in an idle state. Furthermore, the monitoring of each attached device may allow each of the devices to complete all necessary operations prior to powering down. This may allow the devices to be powered down in a clean and safe manner.

BRIEF DESCRIPTION OF THE DRAWINGS

Other objects and advantages of the invention will become apparent upon reading the following detailed description and upon reference to the accompanying drawings in which.

Figure 1A:
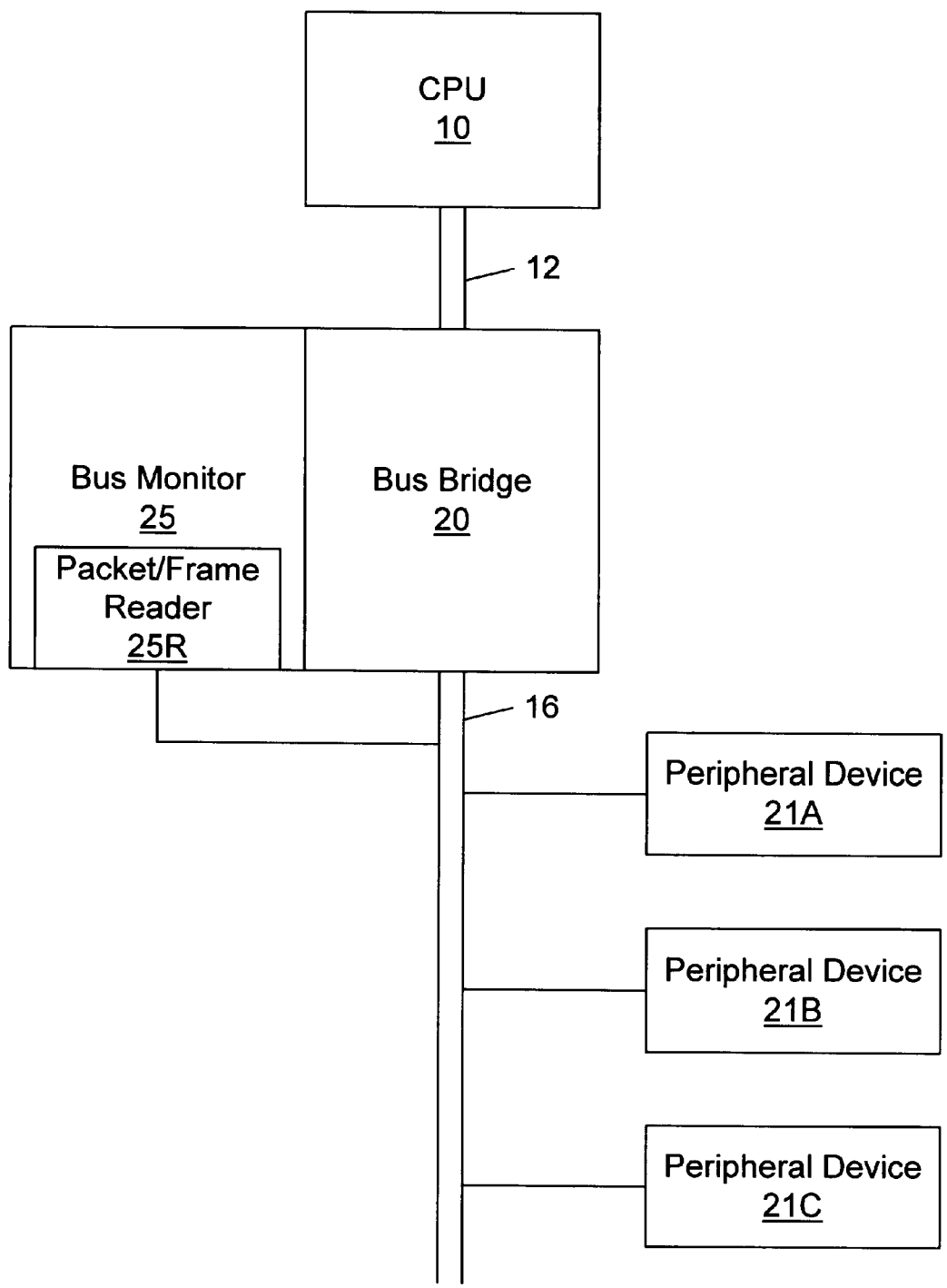
FIG. 1A is a block diagram of one embodiment of a power-manageable resource which includes a timeslot or packet bus.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Turning now to FIG. 1, a block diagram of one embodiment of a power-manageable resource including a timeslot or packet bus is shown. Power-manageable resource (PMR) 16 may be a sharable resource, the control of which may include power-management operations, and may be a packet bus or a timeslot bus of a computer system in the embodiment shown. PMR 16 may be coupled to bus bridge 20, which in turn is coupled to a central processing unit (CPU) 10 by CPU bus 12. In general, bus bridge 20 may be used to provide an interface between CPU 10 and PMR 16. More specifically, bus bridge 20 may translate an operation from the protocol used by the source device or bus to the protocol used by the target device or bus. Also coupled to PMR 16 is bus monitor 25 and peripheral devices 21A, 21B, and 21B. Peripheral devices 21A, 21B, and 21C may be power-manageable devices configured for coupling to PMR 16.

Bus monitor 25 may be a resource monitor configured for monitoring the various devices (i.e. peripherals) coupled to the bus. In particular, bus monitor 25 may be configured to determine the active/inactive status of each of the devices attached to the bus. In the embodiment shown, PMR 16 may be either a packet bus or a timeslot bus. Thus, bus monitor 25 may include packet/frame reader 25R, which may be configured to read frames or packets transmitted on the bus. Each frame or packet may include a status word, which in turn may include a plurality of status bits. These status bits may correspond to individual devices attached to the bus, and may indicate whether the corresponding device is in an active or inactive state. Bus monitor 25 may also be configured to remove power from PMR 16 responsive to determining that all attached devices are inactive. Alternatively, bus monitor 25 may provide an indication that all devices are inactive to bus bridge 20, which may be configured to remove power responsive to receiving such an indication.

Packet/frame reader 25 may be a logic circuit configured to examine frames or packets transmitted on the bus. In some embodiments, each frame or packet transmitted may include active/inactive data for one or more of the devices attached to the bus. These frames or packets may be transmitted by either bus bridge 20 or one of the devices attached to the bus, such as peripheral devices 21A, 21B, and 21C. In another embodiment, each device may be configured to transmit activate packets when becoming active, and deactivate packets when going inactive. In all cases, packet/frame reader 25 may be configured to monitor each packet transmitted on the bus, and may examine the status bits of a status word in each packet or frame. Packet/frame reader 25 may also include a log indicating the active/inactive status of each device coupled to the bus.

In one embodiment in which activate and deactivate packets may be transmitted by devices attached to the bus, a counter may be used to track the active/inactive status of these devices. The counter may represent a portion of the logic circuitry implemented within packet/frame reader 25R. The counter may be incremented when packet/frame reader 25R detects an activate packet transmitted across the bus, and decremented when packet/frame reader 25R detects a deactivate packet transmitted across the bus. If the counter is decremented all the way to a count of zero, it may be an indication that all devices attached to the bus are inactive. As such, bus monitor 25 may respond by removing power from the bus in some embodiments, or, in other embodiments, may provide an indication to bus bridge 20 which may then remove power from the bus.

Figure 1B:
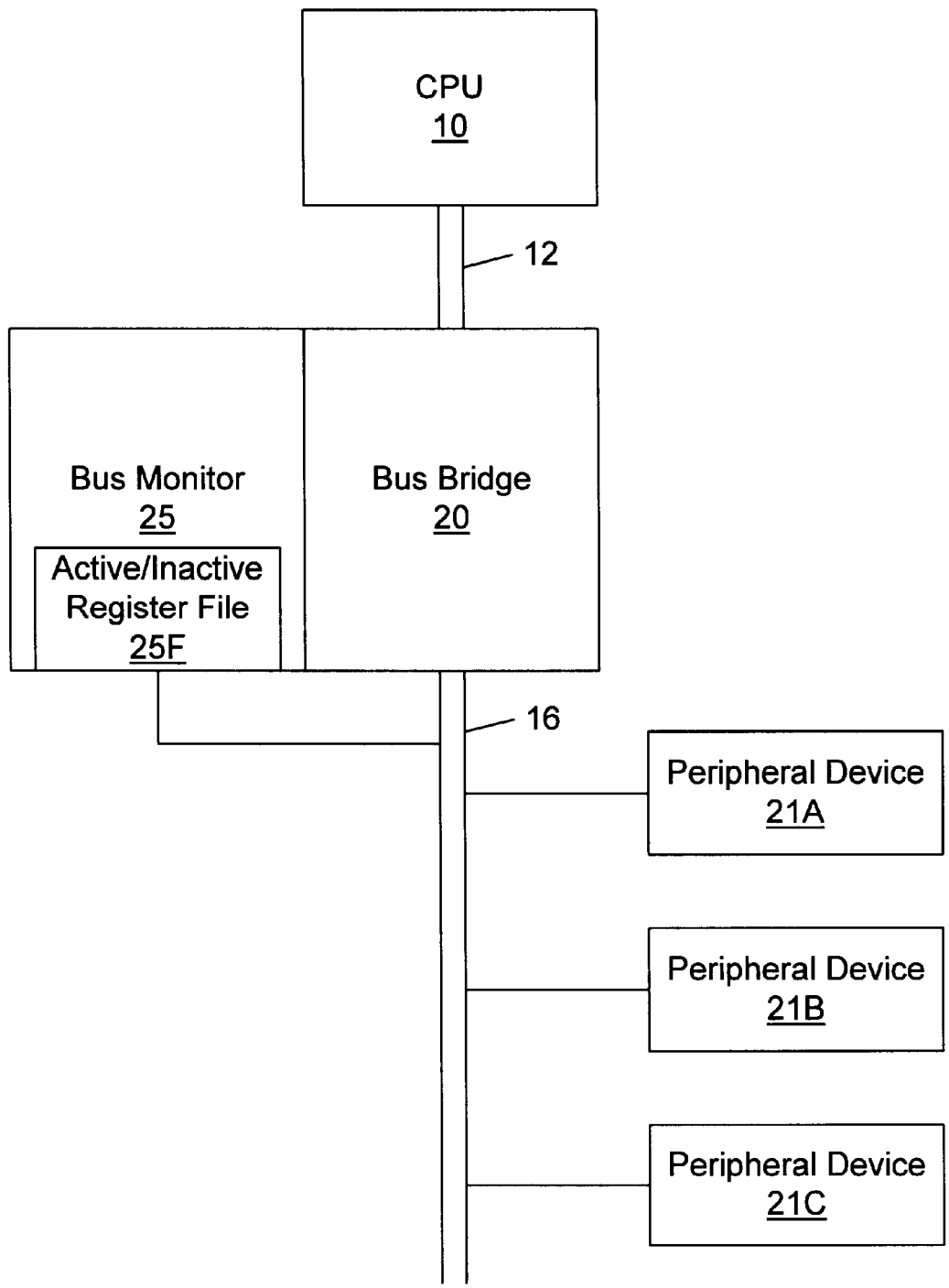
FIG. 1B is a block diagram of one embodiment of a power-manageable resource in which a resource monitor includes a register file for tracking the active/inactive status of devices coupled to the resource.

Moving now to FIG. 1B, a block diagram of one embodiment of a power-manageable resource in which a resource monitor includes a register file for tracking the active/inactive status of devices coupled to the resource is shown. PMR 16 may be a power-manageable resource, such as a peripheral bus. Bus monitor 25 may include register file 25F, which may be a status register used to track the active/inactive status of peripheral devices coupled to the bus. The embodiment shown in FIG. 1B includes peripheral devices 21A, 21B, and 21C. In general, any number of devices may be coupled to the bus. Each peripheral device may be configured to set a corresponding bit in register file 25F to indicate the active/inactive status of the device. Bus monitor 25F may also include logic circuitry configured to examine the status bits in the register file in order to determine the active/inactive status of each device coupled to the bus. In one embodiment, each peripheral device may be configured to set a bit to a logic '1' upon becoming active, and may reset the bit to a logic '0' upon becoming inactive. An alternate embodiment, in which a logic '0' indicates an active device and a logic '1' indicates an inactive device is possible and contemplated.

As previously stated, bus monitor 25 may include a logic circuit configured to examine the status bits in order to determine the active/inactive status of the devices coupled to the bus. If the logic circuit determines that all devices on the bus are currently inactive, it may respond by powering down the bus. In another embodiment, bus monitor 25 may provide an indication of the inactive status of all attached devices to bus bridge 20, which may then respond by powering down the bus.

Figure 1C:
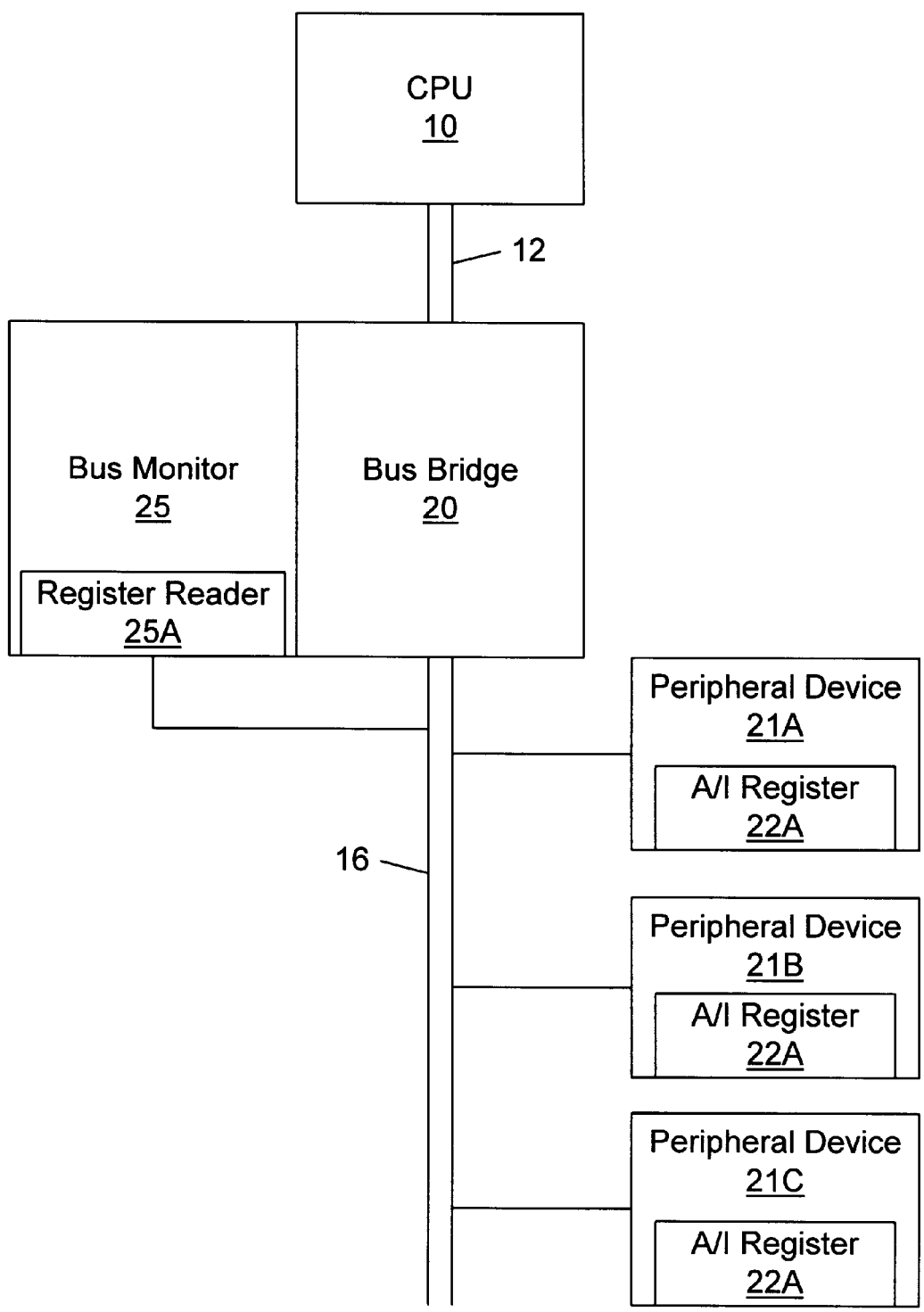
FIG. 1C is a block diagram of one embodiment of a power-manageable resource in which devices coupled to the resource include registers for indicating their respective active/inactive status.

Turning now to FIG. 1C, a block diagram of one embodiment of a power-manageable resource in which devices coupled to the resource include registers for indicating their respective active/inactive status is shown. In this embodiment, each peripheral device (devices 21A, 21B, and 21C) includes active/inactive (A/I) register 22A. A/I register 22A may be used to indicate the active/inactive status of its corresponding device, and may also be used to store other information about the device. Bus monitor 25 may be configured to monitor the active/inactive status of each device attached to the bus. Bus monitor 25 may also include a logic circuit, register reader 25A, which may be configured to examine the individual A/I registers 22A of each device in order to determine the active/inactive status of the corresponding devices. If register reader 25A determines that all devices attached to the bus are inactive, bus monitor 25 may respond by powering down the bus, or providing an indication of this condition to bus bridge 20, which may then power down the bus.

Figure 2A:
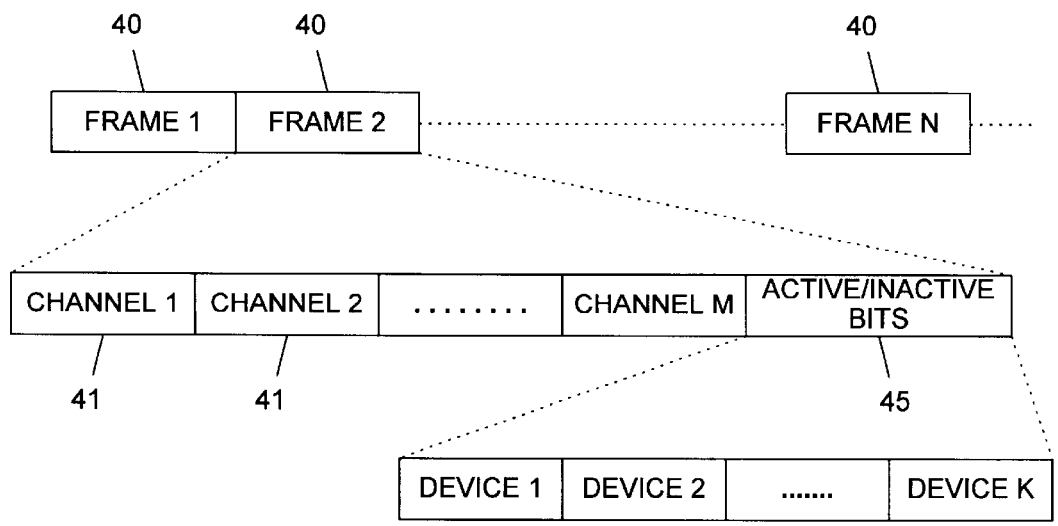
FIG. 2A is an illustration of data transmissions on one embodiment of a timeslot bus, wherein the timeslot bus is a power-manageable resource, and wherein each frame transmitted includes a plurality of status bits for indicating the active/inactive status of devices coupled to the power-manageable resource.

FIG. 2A is an illustration of data transmissions on one embodiment of a timeslot bus, wherein each frame transmitted includes a plurality of status bits for indicating the active/inactive status of devices coupled to the power-manageable resource. In the embodiment shown, the timeslot bus may be a power-manageable resource. The timeslot bus may be a bus such as the one illustrated in FIG. 1A, or may be an alternate embodiment of a timeslot bus. The timeslot bus may be configured for transmission information in frames, such as frames 40 shown in the drawing. Transmission of frames may be performed by any device coupled to the bus, such as a bus bridge or peripheral device.

Each frame 40 may include a plurality of channels 41. Also included in each frame 40 may be a group of active/inactive (A/I) status bits 45. In one embodiment, the group of A/I status bits 45 may include bits for indicating the active/inactive status of each device coupled to the bus. During transmission of each frame, A/I status bits 45 may be read by a logic circuit coupled to the bus, such as packet/frame reader 25R of FIG. 1A. The logic circuit may examine each of A/I status bits 45 with each frame transmitted in order to determine the active/inactive status of each device. The logic circuit may then inform a bus monitor (such as bus monitor 25 of FIG. 1A) when all devices are inactive, which may allow the bus to be powered down.

Figure 2B:
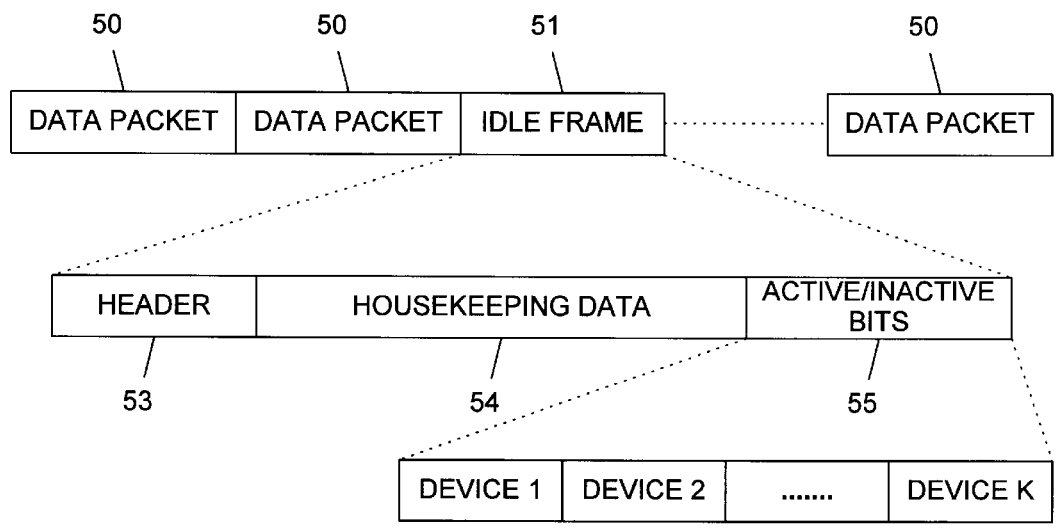
FIG. 2B is an illustration of data transmissions on one embodiment of a packet bus, wherein the packet bus is a power-manageable resource, and wherein the packet bus is configured for periodic transmissions of an idle frame which includes status bits to indicate the active/inactive status of devices attached to the bus.

FIG. 2B is an illustration of data transmissions on one embodiment of a packet bus, wherein the packet bus is configured for periodic transmissions of an idle frame which includes status bits to indicate the active/inactive status of each device attached to the bus. The packet bus in the embodiment shown may be a power-manageable resource. The packet bus may be configured for transmissions of data packets 50. Data packets 50 may be transmitted across the bus by any device attached to it including peripheral devices and any bus bridge. Each of these data packets may be configured to convey data between the various peripherals on the bus, as well as between peripherals and a bus bridge. Idle frame 51 may be a periodic transmission on the bus. The bus may be configured for the transmission of one idle frame within a specified time period in some embodiments (e.g. one idle frame each millisecond). In other embodiments, the bus may be configured for transmission of one idle frame within a specified number of transmissions (e.g. every fourth transmission is an idle frame).

Idle frame 51 may include header 53, housekeeping data 54, and A/I status bits 55. Header 53 may be used to identify the idle frame to a bus bridge and any devices coupled to the bus. Housekeeping data 54 may include information about the bus and various devices attached to it. Such information may include pending operations of a device, interrupt status, and so on. A/I status bits 55 may be a plurality of bits, each of which may correspond with one of the devices coupled to the bus. Each A/I status bit may be used to indicate the active/inactive status of a corresponding device on the bus.

As with the embodiment shown in FIG. 2A, a logic circuit such as packet/frame reader 25R may be used to examine A/I status bits 55, and may inform a bus monitor when all devices attached to the bus are inactive, which may allow the bus to be safely powered down.

Figure 3:
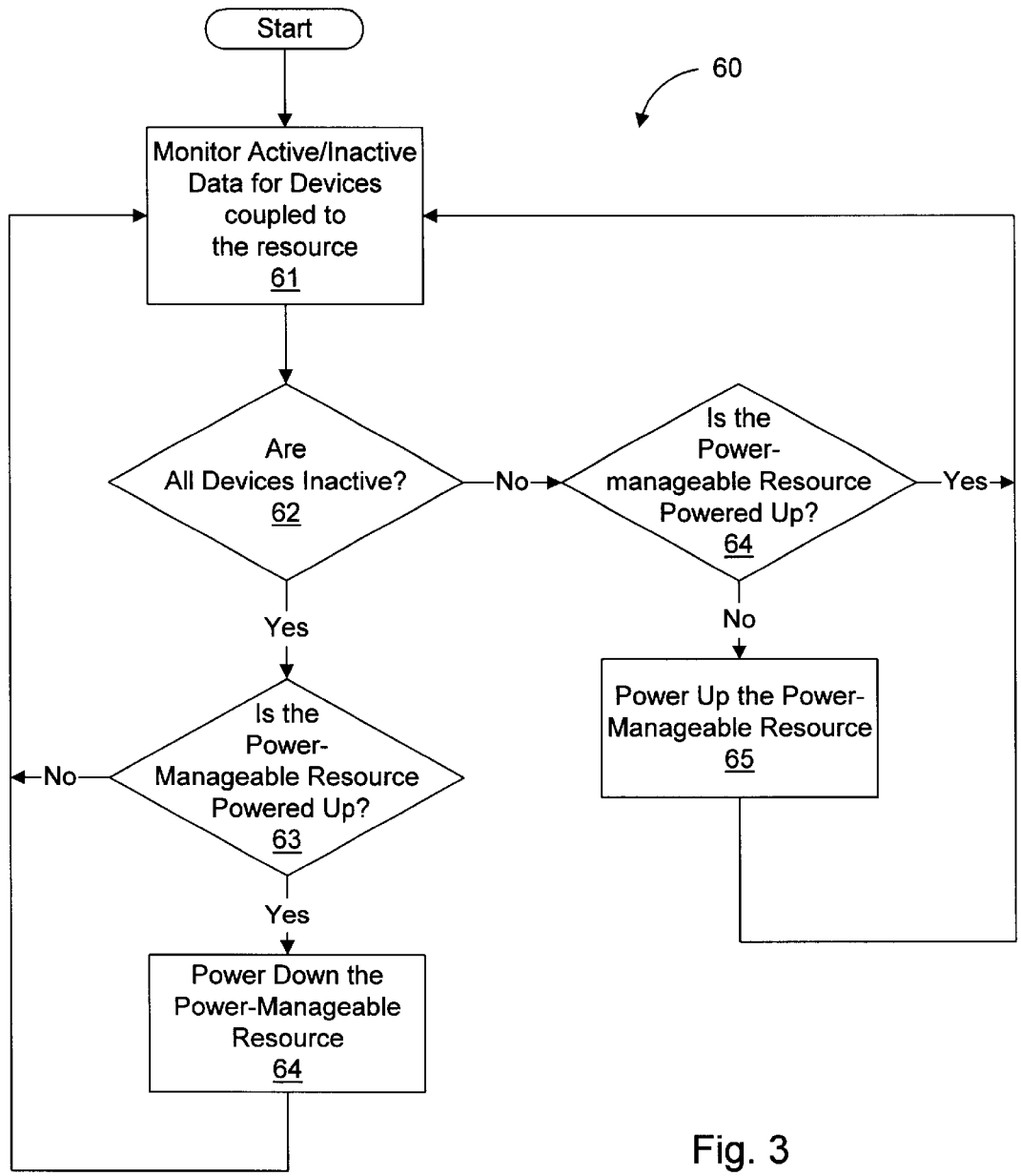
FIG. 3 is a flow diagram of one embodiment of a method of operation of a power-manageable resource.

Turning now to FIG. 3, a flow diagram of one embodiment of a method of operation of a power-manageable resource is shown. Method 60 begins with step 61, which includes monitoring the active/inactive status of those devices coupled to the power-manageable resource. The power-manageable resource may be a bus of a computer system. The monitoring of such a bus may be accomplished by a bus monitor, such as that shown in the various embodiments described in reference to FIGS. 1A, 1B, and 1C. In particular, a bus monitor may include a logic circuit coupled to the bus that may be configured to determine the active/inactive status of each attached device.

If, in step 62, it is determined that all attached devices are inactive, a bus monitor may then make a determination as to whether the bus (i.e. the power-manageable resource) is powered up (Step 63). If the bus is not powered up, then the method may resume monitoring as described in reference to step 61. If the bus is powered up, as determined in Step 63, the bus may then be powered down (Step 64). The powering down of the bus may be accomplished by a bus monitor, a bus bridge, or other attached device having the capability of controlling the power-manageable resource.

If it is determined in Step 62 that one or more devices is currently active, a bus monitor is may then make a determination as to whether the bus is powered up (Step 64). It should be noted that in certain situations a device may be considered active while in a powered down state. For example, a processor of a computer system intends to transfer data to a disk in a disk drive. The disk drive may be attached to a bus that is a power-manageable resource. Responsive to determining that the processor intends to transfer data to the disk, a bus monitor may deem the disk drive to be active, and may respond by initiating a power-up sequence for the bus, as in Step 65. This example is not intended to be limiting, but is only one of many different possibilities. In general, a device may be considered active whenever there is a pending data transfer to or from the device. In such situations, a bus monitor, such as bus monitor 25 of FIGS. 1A, 1B, and 1C, may set an active bit in a register, a data packet, or a frame upon determining that there is a pending data transfer to a device coupled to the bus.

If in Step 64 it is determined that the power-manageable resource is already powered up, the method may then return to Step 61 and continue monitoring the active/inactive data for each device attached to the bus.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method comprising:
    monitoring one or more power-manageable devices coupled to a power-manageable resource, wherein said monitoring includes determining whether all of said one or more power-manageable devices are inactive; and powering down said power-manageable resource if all of said power-manageable devices are inactive;

wherein said power-manageable resource comprises a timeslot bus, and wherein each frame transmitted over said timeslot bus includes a plurality of status bits, wherein each of said status bits corresponds to one of said one or more devices and indicates whether a corresponding device is inactive.

2. The method as recited in claim 1 further comprising, if all of said power-manageable devices are inactive, monitoring each of said one or more power-manageable devices to determine whether any of said power-manageable devices becomes active, wherein said power-manageable resource is powered up responsive to any of said power-manageable devices becoming active.

3. The method as recited in claim 1, wherein said power-manageable resource comprises a packet bus configured to periodically transmit one or more idle frames, wherein each of said one or more idle frames includes a status word, and wherein each status word includes a plurality of status bits, wherein each of said status bits corresponds to one of said one or more devices to determine whether a corresponding device is inactive.

4. The method as recited in claim 1 wherein said resource comprises a packet bus, wherein each of said power-manageable devices is configured to transmit an activate packet responsive to becoming active and a deactivate packet responsive to becoming deactivated, and wherein said monitoring each of said one or more power-manageable devices comprises monitoring said active packet and said deactivate packet for each of said power-manageable devices.

5. The method as recited in claim 4 further comprising identifying said power-manageable device corresponding to each of said activate packets and each of said deactivate packets.

6. The method as recited in claim 4, wherein monitoring said activate and deactivate packets of each of said power-manageable devices comprised incrementing a counter responsive to a detection of an activate packet and decrementing a counter responsive to a detection of a deactivate packet.

7. The method as recited in claim 1, wherein said power-manageable resource includes one or more registers configured to store active/inactive data corresponding to each of said power-manageable devices, wherein said data in one of said registers is updated responsive to a corresponding power-manageable device becoming active or inactive, and wherein said monitoring each of said one or more power-manageable devices comprises monitoring said one or more registers.

8. The method as recited in claim 1, wherein each of said power-manageable devices includes one or more registers configured to store active/inactive data, wherein each of said one or more registers corresponds to one of said power-manageable devices, and wherein said data in one of said registers is updated responsive to a corresponding power-manageable device becoming active or inactive, and wherein said monitoring of said one or more power-manageable devices comprises monitoring said one or more registers.

9. The method as recited in claim 8 further comprising each of said power-manageable devices driving a signal to said power-manageable resource, wherein said signal is indicative of an active/inactive status of a corresponding power-manageable device.

10. A system comprising:

a sharable resource, wherein control of said shareable resource includes power-management operations, and wherein said sharable resource is a bus, wherein said bus comprises a timeslot bus configured for transmitting frames, and wherein each of said frames includes a plurality of status bits, wherein each of said status bits corresponds to one of said one or more devices, and wherein each of said status bits indicates whether a corresponding device is inactive;

one or more devices coupled to said shareable resource, wherein each of said devices is configured to use said sharable resource, and wherein control of said one or more devices includes power management operations; and a resource monitor, wherein said resource monitor is configured to monitor said one or more devices to determine whether all of said devices are inactive, and wherein said resource monitor is configured to cause the powering down of said sharable resource if each of said one or more devices is inactive, wherein said resource monitor includes a logic circuit coupled to said bus, and wherein said logic circuit is configured to examine data transmitted across said bus to determine whether each of said devices is inactive.

11. The system as recited in claim 10, wherein said logic circuit is configured to examine said status bits to determine whether all of said devices are inactive.

12. The system as recited in claim 10, wherein said bus comprises a packet bus configured to periodically transmit one or more idle frames, wherein each of said idle frames includes a status word including a plurality of status bits, wherein each of said status bits corresponds to one of said devices to indicate whether said device is active or inactive.

13. The system as recited in claim 12, wherein said logic circuit is configured to examine said status bits to determine whether all of said devices are inactive.

14. The system as recited in claim 10, wherein said bus comprises a packet bus, wherein each of said devices is configured to transmit an activate packet across said bus responsive to becoming active, and wherein each of said devices is configured to transmit a deactivate packet across said bus responsive to becoming inactive.

15. The system as recited in claim 14, wherein said logic circuit is configured to examine said activate packet and said deactivate packet for each of said devices to determine whether all of said devices are inactive.

16. The system as recited in claim 15, wherein said resource monitor is configured to maintain a log indicative of the active/inactive status for each of said devices.

17. The system as recited in claim 15 further comprising a counter, wherein said resource monitor is configured to increment said counter when an activate packet is detected and wherein said monitor is configured to decrement said counter when a deactivate packet is detected.

18. The system as recited in claim 10 further comprising a status register coupled to said bus, wherein each of said devices is configured to set a corresponding bit in said status register to indicate the active/inactive status of that device.

19. The system as recited in claim 18, wherein said resource monitor includes a logic circuit coupled to said status register, wherein said logic circuit is configured to examine said status register to determine whether all of said devices are inactive.

20. The system as recited in claim 10, wherein each of said one or more devices includes a status register, wherein each of said one or more devices is configured to store a value in said status register to indicate the active/inactive status of that device.

21. The system as recited in claim 20, wherein said resource monitor includes a logic circuit coupled to said bus, wherein said logic circuit is configured to examine said status register for each of said one or more devices in order to determine whether all of said devices are inactive.

22. A method comprising:

monitoring one or more power-manageable devices coupled to a power-manageable resource, wherein said monitoring includes determining whether all of said one or more power-manageable devices are inactive; and powering down said power-manageable resource if all of said power-manageable devices are inactive, wherein said power-manageable resource comprises a packet bus configured to periodically transmit one or more idle frames, wherein each of said one or more idle frames includes a status word, and wherein each status word includes a plurality of status bits, wherein each of said status bits corresponds to one of said one or more devices to determine whether a corresponding device is inactive.

23. A method comprising:

monitoring one or more power-manageable devices coupled to a power-manageable resource, wherein said monitoring includes determining whether all of said one or more power-manageable devices are inactive; and powering down said power-manageable resource if all of said power-manageable devices are inactive, wherein said resource comprises a packet bus, wherein each of said power-manageable devices is configured to transmit an activate packet responsive to becoming active and a deactivate packet responsive to becoming deactivated, and wherein said monitoring each of said one or more power-manageable devices comprises monitoring said active packet and said deactivate packet for each of said power-manageable devices.

24. A method comprising:

monitoring one or more power-manageable devices coupled to a power-manageable resource, wherein said monitoring includes determining whether all of said one or more power-manageable devices are inactive; and powering down said power-manageable resource if all of said power-manageable devices are inactive, wherein each of said power-manageable devices includes one or more registers configured to store active/inactive data, wherein each of said one or more registers corresponds to one of said power-manageable devices, and wherein said data in one of said registers is updated responsive to a corresponding power-manageable device becoming active or inactive, and wherein said monitoring of said one or more power-manageable devices comprises monitoring said one or more registers.

* * * * *